Figure 1:
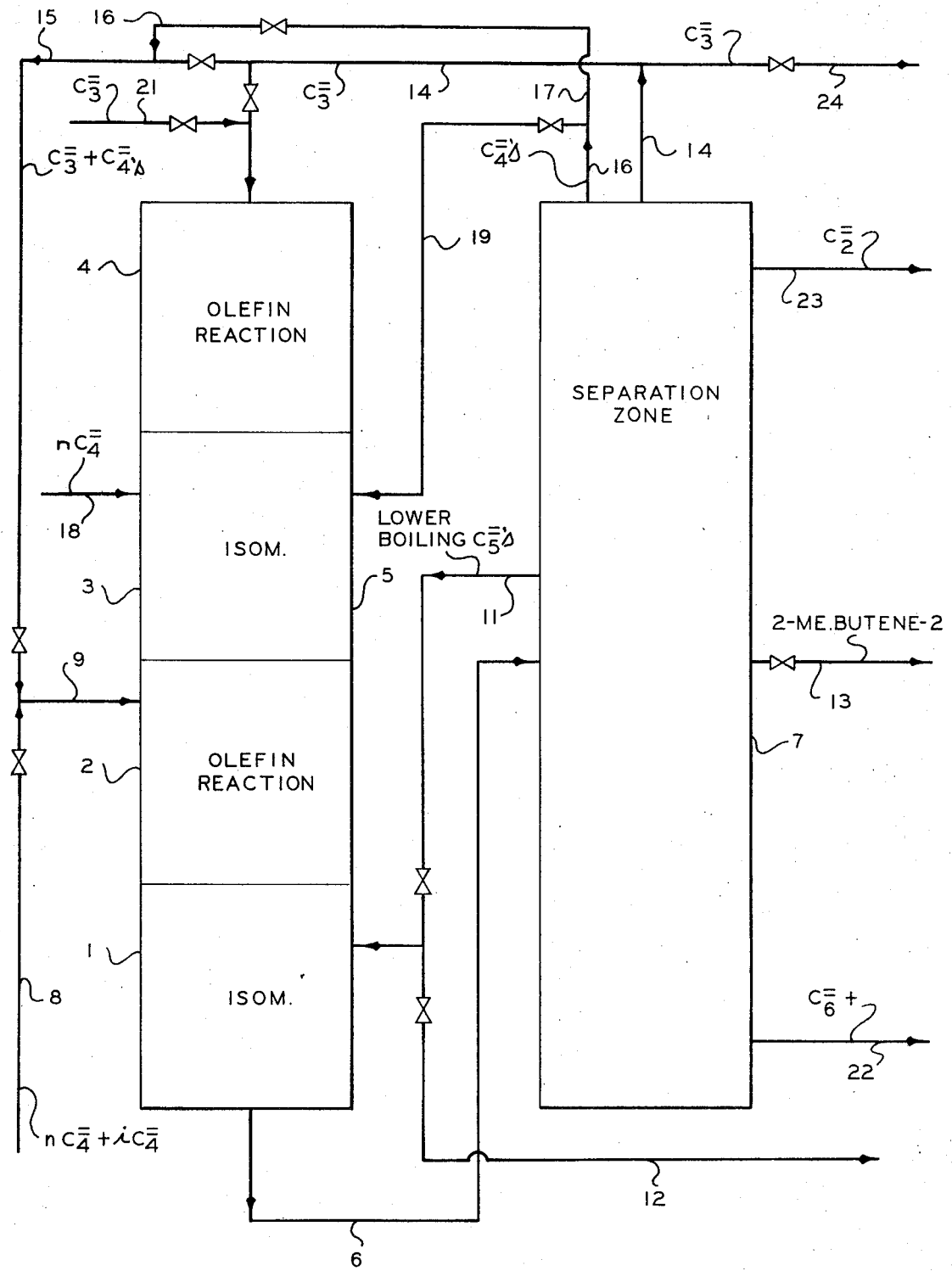

United States Patent [19]

Heckelsberg

[11] 3,723,562

[45] Mar. 27, 1973

[54] CONVERSION OF OLEFINS

[75] Inventor: Louis F. Heckelsberg, Bartlesville, Okla.

[73] Assignee: Phillips Petroleum Company

[22] Filed: Oct. 8, 1970

[21] Appl. No.: 79,328

Related U.S. Application Data

[63] Continuation of Ser. No. 710,393, March 4, 1968, abandoned.

[52] U.S. Cl. .......260/683 D, 260/666 A, 260/677 R, 260/680 R, 260/683.2
[51] Int. Cl..................................................C07c 3/62
[58] Field of Search....... 260/683, 666 A, 680, 677, 683D, 260/683.2

[56] References Cited

UNITED STATES PATENTS

| 3,261,879 | 7/1966 | Banks | 260/683 |
| 2,900,429 | 8/1959 | Heinemann et al. | 260/683.2 |
| 3,365,513 | 1/1968 | Heckelsberg | 260/683 |
| 3,457,320 | 7/1969 | Stapp et al. | 260/683 |
| 2,217,252 | 10/1940 | Hoog | 260/683.2 |
| 3,284,535 | 11/1966 | Edwards et al. | 260/683.2 |

*Primary Examiner*—Delbert E. Gantz
*Assistant Examiner*—C. E. Spresser
*Attorney*—Young and Quigg

[57] ABSTRACT

An olefin hydrocarbon, for example, propylene and/or a butene, is converted to at least one other olefin hydrocarbon, for example, isoamylenes, in a catalytic conversion process utilizing simultaneous or sequential contacting of an olefin reaction catalyst and a skeletal isomerization catalyst.

9 Claims, 2 Drawing Figures

INVENTOR.
L.F. HECKELSBERG

CONVERSION OF OLEFINS

This application is a continuation of Ser. No. 710,393 filed Mar., 4, 1968, now abandoned.

This invention relates to the conversion of olefinic hydrocarbons. In one aspect it relates to preparing isoamylenes, for example, 2-methyl-2-butene, from propylene and/or butenes. In another aspect it relates to the simultaneous or sequential contacting of an olefin with an olefin reaction catalyst and a skeletal isomerization catalyst.

Isoamylenes are valuable intermediates for the production of isoprene. The present invention provides a process whereby isoamylenes such as 2-methyl-2-butene can be prepared from a relatively inexpensive and readily available feed stock, for example, propylene and/or butenes.

Figure 2:
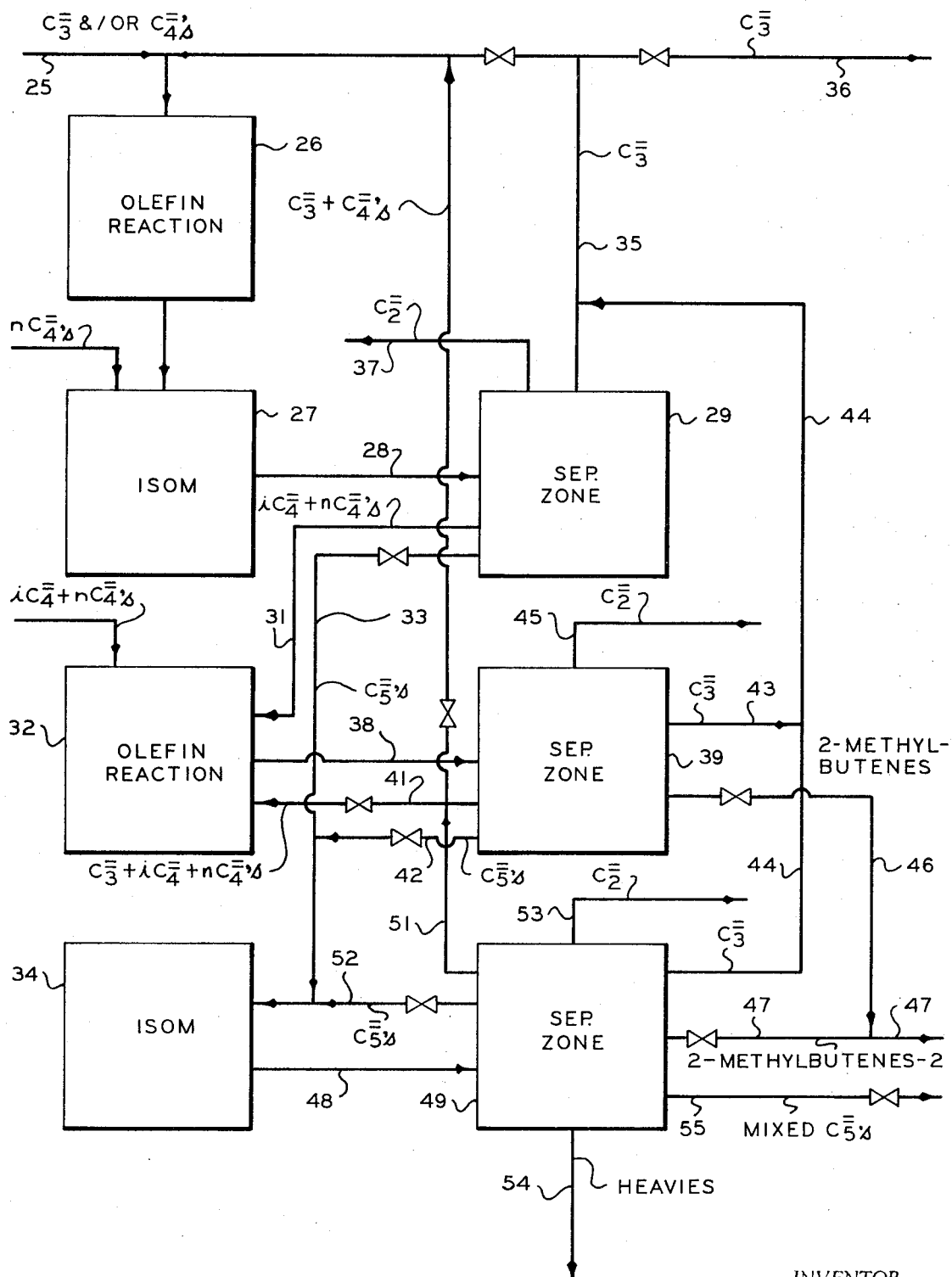

It is an object of this invention to provide a method for converting olefins into other olefins. Another object of this invention is to provide a method for preparing 2-methyl-2-butene. Still another object of this invention is to provide a method for converting propylene into isoamylenes. Still another object of this invention is to provide a method utilizing a combination of olefin reaction steps and skeletal isomerization steps to convert propylene and/or butenes into isoamylenes. Still another object is to provide a catalyst system comprising an admixture of a skeletal isomerization catalyst and an olefin reaction catalyst for the conversion of olefinic hydrocarbons. Other aspects, objects and advantages of my invention will be apparent to one skilled in the art upon study of this disclosure including the detailed description of the invention and the drawing wherein:

FIG. 1 is a schematic flow sheet of a preferred embodiment of the invention; and FIG. 2 is a schematic flow diagram of a modification of the embodiment of FIG. 1.

According to this invention, an olefinic material, or mixture of such olefinic materials capable of undergoing the olefin reaction, is converted by contact, under reaction conditions, with a combination of an olefin reaction catalyst and an olefin skeletal isomerization catalyst.

Further, according to the invention, a mixture of isobutene with butene-2 and/or propylene is contacted with an olefin reaction catalyst so as to produce amylenes, and the olefin reaction effluent containing amylenes is then contacted with a skeletal isomerization catalyst to increase the isoamylene content of the amylene mixture. This mixture is then passed to a separation zone for recovery of an isoamylene-containing stream and recycle of unreacted butenes to the feed to the process. In one embodiment of the invention a stream of 2-methylbutene is recovered from the separation zone as the product. In another embodiment of the invention the butene feed, or at least a portion of the butene feed, is obtained by contacting propylene with a catalyst active for converting propylene into ethylene and butene, and the butene-containing effluent is passed to the isomerization step where the isobutene content of the butene stream is increased. It is within the scope of the invention to include a separation step between the olefin reaction steps and the isomerization steps.

The term olefin reaction, as used herein, is defined as a process for the catalytic conversion over a catalyst of a feed comprising one or more ethylenically unsaturated compounds to produce a resulting product which contains at least ten per cent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated hydrocarbons, and compounds which can be visualized as formed by skeletal isomerization but which cannot be visualized as formed by one or more of the above-noted reactions, comprises less than 25 per cent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds. Said first and second carbon atoms and said third and fourth carbon atoms can be in the same or different molecules.

The olefin reaction includes but is not limited to the following reactions:

1. The disproportionation of an acyclic mono- or polyene having at least three carbon atoms into other acyclic mono- or polyenes of both higher and lower number of carbon atoms; for example, the disproportionation of propylene yields ethylene and butenes;

2. The conversion of an acyclic mono- or polyene having three or more carbon atoms and a different acyclic mono- or polyene having three or more carbon atoms to produce different acyclic olefins; for example, the conversion of propylene and isobutene yields ethylene and isopentenes; and the conversion of butene-2 and isobutene yields propylene and isopentenes;

3. The conversion of ethylene and an internal acyclic mono- or polyene having four or more carbon atoms to produce other olefins having a lower number of carbon atoms than that of the acyclic mono- or polyene; for example, the conversion of ethylene and 4-methyl-2-pentene yields 3-methyl-1-butene and propylene;

4. The conversion of ethylene or an acyclic mono- or polyene having three or more carbon atoms and a cyclic mono- or cyclic polyene to produce an acyclic polyene having a higher number of carbon atoms than that of any of the starting materials; for example, the conversion of cyclooctene and 2-pentene yields 2,10-tridecadiene; the conversion of 1,5-cyclooctadiene and ethylene yields 1,5,9-decatriene;

5. The conversion of one or more cyclic mono- or cyclic polyenes to produce a cyclic polyene having a higher number of carbon atoms than any of the starting materials; for example, the conversion of cyclopentene yields 1,6-cyclodecadiene and continued reaction can produce higher molecular weight materials;

6. The conversion of an acyclic polyene having at least seven carbon atoms and having at least five carbon atoms between any two double bonds to produce acyclic and cyclic mono- and polyenes having a lower number of carbon atoms than that of the feed; for example, the conversion of 1,7-octadiene yields cyclohexene and ethylene; or 7. The conversion of one or more acyclic polyenes having at least three carbon atoms between any two double bonds to produce acyclic and cyclic mono- and polyenes generally having both a higher and lower number of carbon atoms than that of the feed material; for example, the conversion of 1,4-pentadiene yields 1,4-cyclohexadiene and ethylene.

The catalysts which are useful for the present invention are those which have activity for the disproportionation of an olefin into a higher and a lower molecular weight olefin. Catalysts which have activity for disproportionating an olefin into a higher and lower molecular weight olefin are herein referred to as olefin reaction catalysts. Olefin reaction catalysts include heterogeneous catalytic composites which comprise transition metal compounds and which are insoluble in the reactants and homogeneous catalytic systems which comprise transition metal complexes and which are soluble in the reactants. Heterogeneous catalysts are presently preferred. Some examples of heterogeneous olefin reaction catalysts are:

1. silica or thoria promoted by an oxide or compound convertible to an oxide by calcination or by a sulfide of tungsten or molybdenum or by an oxide or compound convertible to an oxide by calcination of rhenium or tellurium;

2. alumina promoted by an oxide or compound convertible to an oxide by calcination of molybdenum, tungsten, or rhenium; by a sulfide of tungsten or molybdenum; or by an alkali metal salt, ammonium salt, alkaline earth metal salt, or bismuth salt of phosphomolybdic acid;

3. one or more of the group zirconia, aluminum phosphate, zirconium phosphate, calcium phosphate, magnesium phosphate, or titanium phosphate promoted by one or more of a sulfide of molybdenum or tungsten, or by an oxide or compound convertible to an oxide by calcination of molybdenum, tungsten or rhenium or by magnesium tungstate or by beryllium phosphotungstate; and 4. silica, alumina, aluminum phosphate, zirconium phosphate, calcium phosphate, magnesium phosphate, or titanium phosphate promoted by a hexacarbonyl of molybdenum or tungsten.

The catalysts of (1) can be prepared and activated by conventional techniques such as by combining a catalyst grade silica with suitable tungsten, molybdenum, rhenium or tellurium compounds by a conventional method such as, for example, impregnation, dry mixing, or coprecipitation. Suitable tungsten and molybdenum compounds include tungsten oxide and molybdenum oxide and compounds convertible to these oxides. The supported oxides are activated by calcining in air and the supported sulfides are activated by heating in an inert atmosphere.

The catalysts of (2) can be prepared and activated by conventional techniques such as by combining catalyst grade alumina with an oxide or a compound convertible to an oxide by calcination of molybdenum, tungsten or rhenium and calcining the resulting mixture after removal of any solvent used in the impregnation. The sulfides of tungsten or molybdenum or the salts of phosphomolybdic acid can be utilized to impregnate a catalyst grade alumina by solution in a proper solvent after which the solvent is evaporated and the resulting mixture dried to prepare the catalyst.

The catalyst compositions of (3) can be prepared and activated by conventional techniques. For example, molybdenum oxide can be coprecipitated with aluminum phosphate followed by calcination in air to produce an activated catalyst. Alternatively, the support material can be impregnated with a compound of the promoter convertible to the oxide, such as ammonium tungstate, followed by calcination in air. In the preparation of a sulfide-containing catalyst, a sulfide of the promoter can be ball-milled with a support, such as zirconium phosphate, followed by heating in an inert atmosphere such as nitrogen. Magnesium tungstate and beryllium phosphotungstate can be dry mixed with titanium phosphate, for example, and activated by calcination in the air at elevated temperatures.

The catalyst compositions of (4) can be prepared and activated by impregnating a previously calcined support material such as calcium phosphate with a solution of the hexacarbonyl of the promoter in an organic solvent such as benzene, followed by drying in a vacuum or in an inert atmosphere at about 50° to 700° F.

The catalytic agent is considered to be the reaction product resulting from the admixture of the support material and the promoter material which is subjected to activation treatment.

The operating temperature for the process of this invention when using catalysts of (1) is in the range of about 400° to 1,100° F. The process of this invention when using the catalysts of (2) will be operated at a temperature in the range of about 150° to 500° F. The process using the catalysts of (3) will be carried out at a temperature of about 600° to 1,200° F. The process using the catalysts of (4) will be carried out at a temperature of about 0° to 600° F. In the process of the invention, pressures are not important but will be in the range of about 0 to 2,000 psig.

Homogeneous olefin reaction catalysts can be used in the embodiments of the present invention which utilize separate reactors. In such embodiments catalyst removal and/or recovery steps are required. Homogeneous catalysts are less preferred, but transition metal-containing homogeneous catalyst systems, which are active for the disproportionation of olefins, can be used, if desired. For example, a catalyst system comprising the reaction product of bis(triphenylphosphine)dinitrosyldichloromolybdenum and methylaluminum sesquichloride can be used in the olefin reaction zone at atmospheric pressure, at room temperature, and preferably in the presence of a reaction diluent.

The olefin reaction catalyst component of the present invention can also be selected from those systems which comprise a compatible mixture of not only the olefin reaction catalyst but also of another catalyst such as a polymerization catalyst, dehydrogenation catalyst, or a double bond isomerization catalyst.

The skeletal isomerization catalyst can be any of the conventional catalysts which are known to be active for skeletal isomerization of olefins. Some examples of these are silica-alumina, eta-alumina, tungsten oxide on eta-alumina, molybdena-boria-alumina, aluminum fluoride, aluminum fluoride promoted with the oxides or sulfides of tungsten, platinum or chromium, chromium sulfate, HF-treated alumina, boron phosphate on alumina, dehydrated bauxite, acid-treated clays, and the like, and mixtures thereof. In general, such catalysts are effective in continuous fixed bed or fluidized bed operation at temperatures in the range of 600°–1,200° F. and at any convenient pressure and throughput rate.

According to the invention, the olefin reaction catalyst and the olefin skeletal isomerization catalyst can be combined in several different ways:

A. Mixed Bed System

An olefinic feed can be converted by contact with a catalytic bed, fixed or fluidized, which is an intimate mixture of a combination of an olefin reaction catalyst and an olefin skeletal isomerization catalyst. The catalysts should be operable and regenerable at approximately the same conditions. Presently preferred combinations of this type include mixtures of oxide, phosphate, or sulfate type catalysts with mixtures of the oxide type most preferred. For example, such a combined catalyst bed containing a mixture of a $WO_3/SiO_2$ olefin reaction catalyst and a $SiO_2/Al_2O_3$ skeletal isomerization catalyst can, in a single step, convert propylene to products which include isoamylenes.

In such mixed bed systems, the particle size of the catalysts involved should be approximately equal and such mixtures can be prepared by simple blending. Alternatively, the olefin reaction catalyst and the skeletal isomerization catalyst can be intimately blended such as by grinding and the powder then formed into other shapes such as tablets, agglomerates, beads, extrudates, and the like such that each particle in the catalytic zone comprises an intimate blend of the two catalysts. Other appropriate methods for obtaining a composite catalyst can also be used. In general, the proportion of the olefin reaction catalyst to the olefin skeletal isomerization catalyst will be in the range of from about 0.1:1 to about 10:1.

B. Consecutive or Alternating Beds

An olefinic feed can be converted by contacting a series of two or more contiguous beds, generally fixed beds, within the same reactor. Each bed consists either of an olefin reaction catalyst or of an olefin skeletal isomerization catalyst, each of these preferably being operable and regenerable under similar conditions. The proportions of the catalysts between any two adjacent beds will generally be in the range of about 1:10 to 10:1.

C. Multiple Reactors

Olefinic feeds can be converted by contacting two or more serially linked reactors, each reactor containing either an olefin reaction catalyst or an olefin skeletal isomerization catalyst, and each reactor capable of being operated and regenerated under its own optimum conditions. The movement of the olefinic stream is from one reactor to another, often without intermediate separation of olefinic materials. In some cases it is advantageous, however, to carry out separations between reactors.

The choice of catalysts, in this embodiment, is broad to any olefin reaction catalyst and to any olefin skeletal isomerization catalyst. Each catalytic reactor is operated under conditions which are operable and desirable for the specific catalyst used within that reactor.

The olefinic feed materials which can be converted to other olefinic products using the process of the present invention are any of those which respond to olefin reaction catalysts. In general, suitable feeds can be acyclic mono- and polyenes having from three to about 30 carbon atoms per molecule, or cyclic mono- and polyenes having from four to about 30 carbon atoms per molecule, or mixtures of these, including mixtures with ethylene.

The process of the present invention has been unexpectedly found to extend still further the value of the olefin reaction. For example, it has been found capable of converting unbranched or relatively unbranched olefinic materials to other branched olefinic products or products whose branching is increased. As a specific example, it has been found that propylene can be converted to isoamylenes in a single step by contact with a mixed catalyst bed containing $SiO_2/Al_2O_3$ and $WO_3/SiO_2$.

The process can also be used to convert highly branched olefinic feeds to other less branched products. For example, a highly branched mixture of pentenes and heavier olefins, containing substantial amounts of quaternary carbon structures, can be consecutively passed, in admixture with ethylene, through a bed of $WO_3/Al_2O_3$ and then through an adjacent bed of $WO_3/SiO_2$—MgO in a single reactor maintained at about 900° F. to yield olefin products containing increased quantities of isobutene. For example, neohexene (3,3-dimethylbutene-1) cannot be cleaved with ethylene over an olefin reaction catalyst even in the presence of a carbon double bond isomerization catalyst, but neohexene and ethylene react in the presence of a combined skeletal isomerization catalyst and olefin reaction catalyst to produce a product containing isobutylene.

In still other applications of the invention, propylene and/or butenes can be converted to 2-methyl-2-butene or other amylenes as shown in FIGS. 1 and 2.

Referring now to FIG. 1 there is illustrated a schematic flow diagram of a system whereby various modifications of the process of the invention can be carried out. A vessel 5 is divided into contiguous compartments identified by the numerals 1, 2, 3 and 4. The region of the vessel identified by numeral 1 contains a skeletal isomerization catalyst such as, for example, silica-alumina. In the adjacent region identified by the numeral 2 is a catalyst capable of converting olefins according to the olefin reaction, for example, such as tungsten oxide supported on silica. In the adjacent region identified by the numeral 3 will be another charge of isomerization catalyst and in the adjacent region identified by the numeral 4 will be a second charge of olefin reaction catalyst. The two isomerization catalysts will preferably be the same and the two olefin reaction catalysts will preferably be the same so as to facilitate operation since the operations can then be carried out at substantially the same conditions of temperature and pressure. Generally, the volume of the isomerization catalyst will be greater than that of the olefin reaction catalyst, and these catalysts will be selected so as to have substantially the same operation and regenerating temperatures. The effluent from the isomerization zone or region identified by the numeral 1 is passed through line 6 to separation zone 7 which is not intended to represent a single vessel but rather a separations area containing several vessels which can be distillation vessels, fractional crystallization vessels, chemical reaction vessels, or other means for separation of hydrocarbons.

A mixture of $C_4$ olefins including butene-2 and preferably at least 50 mole per cent isobutene can be passed via conduits 8 and 9 to olefin reaction zone 2 wherein these olefins react to form amylenes which pass into isomerization zone 1 wherein the 2-methyl-2-butene content of the isoamylenes is increased. The effluent then passes through conduit 6 to separation zone 7 for recovery of 2-methyl-2-butene as product. The lower boiling amylenes which include the linear amylenes are recycled through conduit 11 to the isomerization zone 1. If a mixture of amylenes is desired rather than the substantially pure stream of 2-methyl-2-butene, the mixture of amylenes can be removed via conduit 12 instead of being separated and passed through lines 11 and 13. Any propylene produced in the reaction can be passed through conduit 14 to conduit 15. Any separated $C_4$'s can be passed via conduits 16 and 17 to conduit 15. The propylene and butenes contained in conduit 15 can be introduced via conduit 9 into olefin reaction zone 2.

Alternatively, the olefin reaction zone 2 and the skeletal isomerization zone 1 can be consolidated, if desired, into a single zone in which there is a suitable combination of olefin reaction catalyst and a skeletal isomerization catalyst. One example is a mixture of particulate tungsten oxide/silica and silica/alumina. Feeding such a combined reaction zone with the above-described mixture of butenes produces an effluent containing substantial amounts of mixed amylenes.

In another modification of the embodiment of the invention shown in FIG. 1 a stream of normal butenes which can contain either 1-butene or 2-butene or a mixture of these butenes is fed via conduit 18 to the isomerization zone 3 of vessel 5 and the effluent from zone 3 passes through zones 2 and 1 and then via conduit 6 through separation zone 7. Unreacted butenes are recycled via conduits 16 and 19 to isomerization zone 3. The isoamylenes are recovered as in the previous modification discussed.

In still another modification of preferred embodiment of the invention shown in FIG. 1 propylene or a propylene-butene mixture is passed via conduit 21 to olefin reaction zone 4 in vessel 5 and the effluent from olefin reaction zone 4 passes consecutively through isomerization zone 3, olefin reaction zone 2, and isomerization zone 1 and thence through conduit 6 to separation zone 7. Unreacted propylene is recycled through conduit 14 to conduit 21 and thence to olefin reaction zone 4. $C_4$ olefins are passed from separation zone 7 via conduit 16 to olefin reaction zone 4 and low boiling pentenes are passed via conduit 11 to isomerization zone 1 or removed via conduit 12 as product.

It will often be desirable to operate two or more of the above modifications of the invention simultaneously. For example, a mixture of normal butenes and isobutenes is passed via conduits 8 and 9 to olefin reaction zone 2; a mixture of normal butenes is passed via conduit 18 to isomerization zone 3 and propylene is passed via conduit 21 to olefin reaction zone 4. In this case a mixture of propylene from conduit 14 and a mixture of butenes from conduit 16 will be passed through conduit 15 and conduit 9 to olefin reaction zone 2. In any of the above modifications a stream of $C_6$ and heavier will be removed in conduit 22 from separation zone 7 and a stream of ethylene will be removed via conduit 23. If desired, a stream of propylene can be removed via conduit 24.

The preceding embodiments of the invention as shown in FIG. 1 employ reaction zones operated in the range of from about 600° F. to about 1,200° F. and at any convenient pressure. The reaction time will vary depending upon the feed materials and the desired degree of conversion but will generally fall in the range of 0.1 to 60 seconds. The catalysts used in these zones are those which have been previously described as compatible and operable at these high temperatures. The proportion of olefin reaction catalyst and skeletal isomerization catalyst in the mixed bed or adjacent catalyst bed operation will generally be in the range of 0.1:1 to about 10:1.

Referring now to FIG. 2 there is illustrated a schematic flow diagram for a modification of the embodiment of FIG. 1 wherein the effluent from the second, third, and fourth reactors is separated and certain select fractions are recycled or passed to the next reactor. Thus, propylene or a propylene-butene mixture can be introduced via conduit 25 into the olefin reaction end zone 26 the effluent of which will be passed to the skeletal isomerization zone 27 and the effluent from the skeletal isomerization zone 27 will be passed via conduit 28 to separation zone 29. A mixture of normal butenes and isobutenes is passed from separation zone 29 via conduit 31 to olefin reaction zone 32 and any amylenes which were formed in zone 26 will be passed from separation zone 29 via conduit 33 to isomerization zone 34. Propylene removed from separation zone 29 is combined with any propylene from later separation zones and passed via conduit 35 and conduit 25 to olefin reaction zone 26 or can be recovered as product via conduit 36. Ethylene and any materials lighter than ethylene will be removed via conduit 37. The effluent from olefin reaction zone 32 passes via conduit 38 to separation zone 39. A mixture of butenes and at least some propylene is returned via conduits 41 and 51 to olefin reaction zone 26; $C_5$ olefins are passed via conduits 42, 33 and 52 to isomerization zone 34; the remainder of the propylene is passed via conduits 43 and 44 to conduit 35; and ethylene and lighter are removed via conduit 45. A stream of substantially pure 2-methyl-2-butene is removed via conduits 46 and 47. The effluent from isomerization zone 34 is passed via conduit 48 to separation zone 49. A mixture of butenes and at least some propylene is passed via conduit 51 to olefin reaction zone 26. A stream of lower boiling amylenes is returned via conduit 52 to isomerization zone 34. The remainder of the propylene is passed via conduit 44 to conduit 35. Ethylene and lighter materials are removed via conduit 53 and a stream of $C_6$ and heavier is removed via conduit 54. Substantially pure 2-methyl-2-butene is removed via conduit 47 as product and a stream of mixed amylenes can be removed via conduit 55.

In another embodiment of FIG. 2, a stream of n-butenes is fed into skeletal isomerization zone 27. The effluent from zone 27 is passed, via conduit 28, into separation zone 29 from which any ethylene or lighter materials are expelled from the process via conduit 37, the isomerized butenes mixture is conducted via conduit 31 to olefin reaction zone 32, and the amylenes and heavier materials are conducted to skeletal isomerization zone 34 via conduits 33 and 52. The effluent from olefin reaction zone 32 is conducted through conduit 38 to separation zone 39 from which any ethylene or other light materials are expelled from the process via conduit 45, propylene and butenes are returned to olefin reaction zone 32 via conduit 41, and amylenes and heavier are conducted to skeletal isomerization zone 34 via conduits 42, 33 and 52. If desired a stream of the highest boiling amylene, 2-methyl-2-butene, can be removed as product from separation zone 39 via 46. The effluent from skeletal isomerization zone 34 is conducted via conduit 48 to separation zone 49 from which 2-methyl-2-butene is removed as a product stream through conduit 47, lower boiling amylenes are returned to skeletal isomerization zone 34 via conduit 52, a mixture of propylene and butenes is returned to olefin reaction zone 32 via conduits 51 and 41, any light materials are removed from the process via conduit 53, and heavy by-products are expelled from the process via conduit 54. If desired, a product stream of mixed amylenes, with substantial amounts of isoamylenes, can be removed from separation zone 49 as a product stream through conduit 55.

In still another embodiment of FIG. 2, a mixture of isobutene and n-butenes, preferably containing at least about 50 mole per cent isobutene, is fed into olefin reaction zone 32. The effluent of olefin reaction zone 32 is passed into separation zone 39 from which ethylene and any light materials are expelled from the process via conduit 45, a mixture of propylene and butenes is returned to olefin reaction zone 32 via conduit 41, and the amylenes and heavier are conducted to skeletal isomerization zone 34. The effluent from skeletal isomerization zone 34 is conducted to separation zone 49 where it is separated as described in the embodiment immediately above to recover 2-methyl-2butene and/or mixed amylenes.

It will readily be understood by those skilled in the art that numerous items of equipment necessary to the operation of a system such as those shown in FIGS. 1 and 2 have been omitted, such as valves, motors, heating equipment, pumps, and numerous other items. One skilled in the art will readily know where to use the appropriate item of equipment.

The preceding embodiments of the invention as shown in FIG. 2 employ reaction zones operated under conditions which are wholly dependent upon the specific catalyst systems utilized in those zones. Thus, the skeletal isomerization zones will generally be operated at 600°–1,200° F. and at any convenient pressure and throughput rate. The olefin reaction zones, on the other hand, can be independently operated using any of previously described olefin reaction catalysts and under conditions suitable for each catalyst.

EXAMPLE I

A vertical tubular reactor was charged with 5 volumes of a silica alumina catalyst, 1 volume of a tungsten oxide-silica catalyst (containing about 8 weight per cent tungsten oxide), 3 volumes of the same silica-alumina catalyst and then 1 volume of the same tungsten-oxide silica catalyst and finally with 2 volumes of glass beads. This mixed bed catalyst system was activated by pretreatment with flowing dry air at 1,100° F. for 1 hour followed by cooling to about 1,000° F. in flowing nitrogen. Propylene was then passed into the top of this fixed bed reactor at atmospheric pressure, 1,000° F., and at a weight hourly space velocity of about 20 weight parts propylene per weight part catalyst per hour. Propylene passes through the reactor by first contacting the glass beads used as a preheat zone and then contacting the tungsten oxide-silica catalyst layer followed by successive contact of the remaining layers of the catalyst. After about 4¾ hours on stream the effluent from the tubular reactor was analyzed and found to contain the following products:

| Olefin Product | Weight Per Cent |
| --- | --- |
| ethylene | 6.8 |
| 1-butene/isobutene | 27.3 |
| t-2-butene | 26.9 |
| c-2-butene | 19.5 |
| 3-methyl-1-butene | 0.2 |
| 1-pentene | 0.4 |
| 2-methyl-1-butene | 2.1 |
| t-2-pentene | 1.9 |
| c-2-pentene | 1.1 |
| 2-methyl-2-butene | 4.0 |
| heavies | 10.1 |

The conversion of propylene in the above test was 47.2 per cent. About 6.3 weight per cent of the products formed were isoamylenes, most of the remainder being butenes and pentenes which could be recycled together with the unconverted propylene.

EXAMPLE II

A vertical tubular fixed bed reactor was charged with 5 volumes of silica-alumina isomerization catalyst, 1 volume of tungsten oxide on silica olefin reaction catalyst (containing about 8 per cent tungsten oxide), and with another 3 volumes of the silica-alumina catalyst followed by 3 volumes of glass beads which was used as a preheat zone. This multiple layer catalyst bed was activated by heating the bed to 1,100° F. for about 1 hour while passing dry air through the bed. The bed was then cooled to about 1,000° F. in flowing nitrogen.

At a temperature of 1,000° F., atmospheric pressure and at a gaseous hourly space rate of about 65 volumes of feed per volume of catalyst per hour, a stream of cis-butene-2 was fed through the reactor in a direction so as to first contact the glass beads and 3 volume bed of silica-alumina. After being on stream 2 hours, the effluent was analyzed and the products which were formed are listed below:

| Olefin Product | Weight Per Cent |
| --- | --- |
| Propylene | 32.2 |
| 3-methyl-1-butene | 1.4 |
| 1-pentene | 3.4 |
| 2-methyl-1-butene | 9.0 |
| trans-2-pentene | 9.9 |
| cis-2-pentene | 5.4 |
| 2-methyl-2-butene | 15.1 |
| C$_6$+ | 23.6 |

The butene conversion in the above run was found to be 44 per cent. The disproportionation efficiency to propylene and pentenes was 77 per cent. The data also show that 25.5 weight per cent of the products were isoamylenes.

EXAMPLE III

A tubular steel reactor was charged with an admixture of 0.8 parts by weight of tungsten oxide-silica catalyst (containing about 8 weight per cent tungsten oxide) and 1.8 parts by weight of a silica-alumina catalyst having a silica:alumina ratio of about 88:12.

This admixture of catalysts was activated by pretreatment with flowing dry air for one hour at 1,100° F. The catalyst bed was then flushed with nitrogen and propylene was passed through the bed at 800° F., 100 psig, and at a gaseous hourly space rate of 10 parts by weight of gas per part by weight of catalyst per hour.

After 1 hour the effluent was analyzed and the results are shown in the tabulation below. For purpose of comparison, a control run was carried out under substantially identical conditions with no silica-alumina in the catalyst. The results of this run are also shown in the tabulation below:

| Catalyst | Control Run<br>2 parts by weight<br>of $WO_3 \cdot SiO_2$ | Invention Run<br>1.8 parts by wt. $SiO_2/Al_2O_3$<br>0.8 parts by wt. $WO_3 \cdot SiO_2$ |
|---|---|---|

Operating Conditions

| | | |
|---|---|---|
| Temperature, °F. | 800 | 800 |
| Pressure, psig | 100 | 100 |
| Space Rate, w/w/hr. | 15 | 10 |
| Feed | propylene | propylene |

Product Analyses (wt. %)

| | | |
|---|---|---|
| Ethylene | 37.6 | trace |
| Isobutene + butene-1 | 11.3 | 21.1 |
| t-Butene-2 | 28.5 | 17.9 |
| c-Butene-2 | 22.6 | 11.9 |
| (Unidentified) | | 4.0 |
| 3-Methylbutene-1 | | 0.7 |
| Pentene-1 | | 1.8 |
| 2-Methylbutene-1 | | 5.0 |
| t-Pentene-2 | | 4.5 |
| c-Pentent-2 | | 2.2 |
| 2-Methylbutene-2 | | 10.4 |
| (Unidentified) | | 3.7 |
| Heavies | | 16.8 |
| Propylene conversion | 19 | 60 |
| Per cent isoamylenes in product | | 16 |

The data in the tabulation above shows that the admixture of an olefin reaction catalyst and a skeletal isomerization catalyst in a single catalytic bed is capable of converting propylene to isoamylenes in a single pass in good yield.

That which is claimed is:

1. A process wherein a feed stream comprising an acyclic mono- or polyene having from three to about 30 carbon atoms per molecule, a cyclic mono- or polyene having from four to about 30 carbon atoms per molecule, a mixture of such acyclic or cyclic mono- or polyenes, or a mixture of such acyclic or cyclic mono- or polyenes and ethylene is contacted with a combination of an olefin reaction catalyst and a skeletal isomerization catalyst under conditions suitable to produce a product of the olefin reaction which, as defined herein, can be visualized as comprising the reaction between two first pairs of carbon atoms, the two carbon atoms of each first pair being connected by an olefinic double bond, to form two new pairs from the carbon atoms of said first pairs, the two carbon atoms of each of said new pairs being connected by an olefinic double bond wherein the skeletal isomerization catalyst and the olefin reaction catalyst are maintained in separate reaction zones and the feed stream is contacted first with the skeletal isomerization catalyst and then with the olefin reaction catalyst.

2. The process of claim 1 wherein the feed stream comprises a mixture of isobutene and normal butenes.

3. The process of claim 1 wherein the feed stream comprises normal butenes.

4. The process of claim 1 wherein the feed stream comprises propylene.

5. The process of claim 1 wherein the feed stream comprises neohexene and ethylene.

6. The process of claim 1 wherein a hydrocarbon separation zone is positioned between and in communication with the catalytic zones.

7. The process of claim 1 wherein the skeletal isomerization catalyst and the olefin reaction catalyst are positioned in a fixed bed reactor in contiguous but separate relationship.

8. A process wherein a feed stream comprising an acyclic mono- or polyene having from three to about 30 carbon atoms per molecule, a cyclic mono- or polyene having from four to about 30 carbon atoms per molecule, a mixture of such acyclic or cyclic mono- or polyenes, or a mixture of such acyclic or cyclic mono- or polyenes and ethylene is contacted with a mixture of an olefin reaction catalyst as a first component and a skeletal isomerization catalyst as a second component under conditions suitable to produce a product of the olefin reaction which, as defined herein, can be visualized as comprising the reaction between the two first pairs of carbon atoms, the two carbon atoms of each first pair being connected by an olefinic double bond, to form two new pairs from the carbon atoms of said first pairs, the two carbon atoms of each of said new pairs being connected by an olefinic double bond wherein said olefin reaction catalyst and said skeletal isomerization catalyst are of different elemental compositions and the skeletal isomerization catalyst is selected from the group consisting of silica-alumina, eta-alumina, tungsten oxide on eta-alumina, molybdena-boria-alumina, aluminum fluoride, aluminum fluoride promoted with an oxide or sulfide of tungsten, platinum or chromium, chromium sulfate, HF-treated alumina, boron phosphate on alumina, dehydrated bauxite, acid-treated clays and mixtures thereof and the contact with the skeletal isomerization catalyst is at a temperature in the range of 600° to 1,200°F.

9. The process of claim 8 wherein the catalyst admixture is a combined catalyst bed containing a mixture of a $WO_3SiO_2$ olefin reaction catalyst and an $SiO_2Al_2O_3$ isomerization catalyst.

* * * * *